Figure 1:
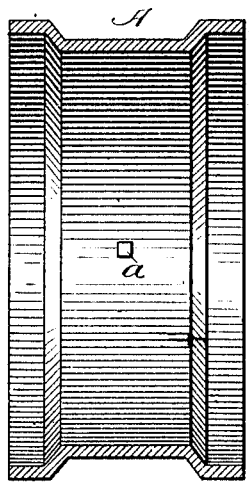

G. W. KERN.
THREADLESS COUPLING FOR PIPES.
APPLICATION FILED MAY 4, 1912.

1,048,703.

Patented Dec. 31, 1912.

Witnesses
Edwin L. Bradford
Wm E. Dyre

Inventor
George W. Kern
By Ritter & Ritter
Attorneys

UNITED STATES PATENT OFFICE.

GEORGE W. KERN, OF OIL CITY, PENNSYLVANIA, ASSIGNOR TO OIL WELL SUPPLY COMPANY, OF PITTSBURGH, PENNSYLVANIA, A CORPORATION OF PENNSYLVANIA.

THREADLESS COUPLING FOR PIPES.

1,048,703.  Specification of Letters Patent.  Patented Dec. 31, 1912.

Application filed May 4, 1912. Serial No. 695,183.

*To all whom it may concern:*

Be it known that I, GEORGE W. KERN, a citizen of the United States, residing at Oil City, in the county of Venango and State of Pennsylvania, have invented certain new and useful Improvements in Threadless Couplings for Pipes; and I do hereby declare the following to be a full, clear, and exact description of the invention, such as will enable others skilled in the art to which it appertains to make and use the same.

My invention relates to that class of pipe couplings especially devised for the laying of oil, gas, or water pipes on uneven ground where it is difficult and at times impossible to preserve the alinement of the pipe sections, and where, consequently, threaded couplings are not available or advisable.

This class of couplings, which may be made from either cast, malleable or wrought metal, is commonly provided with flaring ends for the reception of gaskets and followers, and with centrally and internally disposed lugs or projections to determine the extent to which the pipe ends shall enter the coupling, or in other words, to center the pipe sections in the coupling, and said central lugs are preferably of a character which will permit them to yield or crush under excessive strain so that when necessary a coupling sleeve or coupling center may be driven along or off the pipe. In the case of cast metal couplings said centrally disposed lugs are, of course, cast with the coupling, but in case of malleable or wrought metal couplings the practice heretofore has been to produce said centrally disposed lugs either by upsetting the metal of the coupling from without, by means of a punch or other suitable tool, or by welding the lugs or projections on the interior of the coupling. The first method, viz., upsetting the metal from without, reduces the thickness of the metal at that point of the coupling, leaves a depression in its outer surface, which is readily attacked by corrosion, and which eventually weakens the coupling; while the second method, viz., the welding the lugs to the inner face of the coupling renders the lugs very frangible and liable to be broken off by a strain much less than the coupling should be normally able to resist.

The object of my present invention is the production of a coupling center of the character described, wherein the centering lugs on the interior of the coupling-center shall be constituted by and integral with the body metal of the coupling-center, the coupling center itself shall be reinforced at said point or points, and its exterior surface shall be continuous or unbroken; and my invention, generally stated, embraces a threadless coupling having the characteristics above noted.

Figure 2:
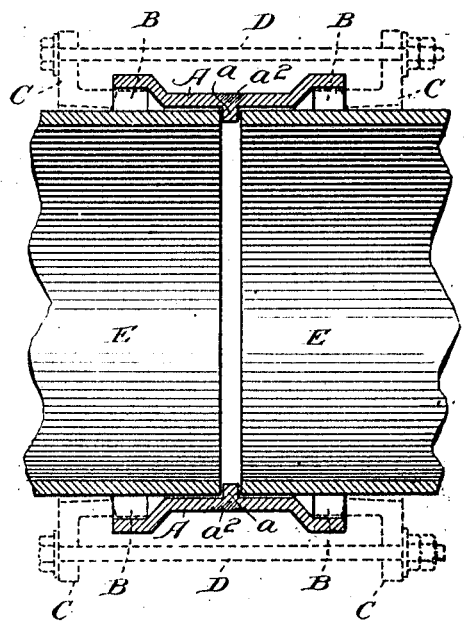
Figure 3:
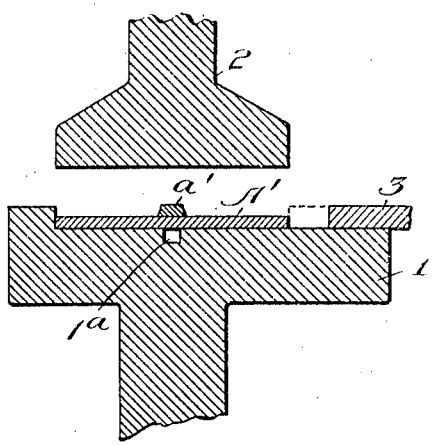
Figure 4:

In the drawings chosen to illustrate my invention, the scope whereof is pointed out in the claims, Figure 1 is a central section of a threadless coupling-center embodying my invention. Fig. 2 is a similar section of the coupling-center shown in Fig. 1, and of the ends of pipes coupled thereby, the usual gaskets, ring followers, and bolts which complete the coupling being shown by dotted lines. Fig. 3 is a sectional view of the operative portions of mechanism which may be employed to produce my coupling-center, and Fig. 4 is an enlarged sectional view of a portion of the plate from which the coupling-center is formed, having the centering lug thereon as the plate comes from the machine.

Like symbols refer to like parts wherever they occur.

I will now proceed to describe my invention more fully so that others skilled in the art to which it appertains may apply the same.

In the drawings, A indicates a coupling-center having the centering lugs or projections *a a* on its interior, said lugs being disposed centrally of the ring or coupling member A, and being preferably two in number arranged at diametrically opposite points on the interior of the coupling center.

Indicated by dotted lines at B, B are the gaskets, at C, C the ring followers, and at D, D the bolts which go to complete the coupling as a whole.

E, E indicate the ends of the pipes which the coupling is intended to connect, and it will be noted that as illustrated in the drawings the pipe sections are in alinement and the ends in contact with the center lugs or projections *a a* of the coupling center A, but in the absence of threads on pipe and the coupling center the pipes may assume any relation to the coupling that the lay of the ground may demand, and the lugs *a* will prevent the ends of the sections from being crowded beyond the center of the coupling.

In producing the coupling center A with the internal central projections *a*, I first place the plate A', brought to a welding heat, upon a suitable bed or die having a lug recess corresponding to the form and position of the lug or projection *a* to be produced. I next place upon the upper or outer surface of plate A' a piece of metal *a* of like character as that in plate A', also brought to a welding heat, and then by means of a suitable hammer, drop, or its equivalent, force the metal *a'* into the outer or upper surface of said plate A' and by the same operation force metal from the body of plate A' into the lug recess of the bed or die of the machine, thus producing a coupling-center having the lugs or stops *a* on its interior formed from and integral with the body of the metal constituting the coupling ring A, the ring A having a continuous outer surface and being reinforced as at *a²* by the metal which has been welded to and consolidated with the outer surface of the coupling center.

For the purposes of this specification I have shown in the drawing, as mechanism adapted for the purpose, an anvil or bed 1 having a lug recess 1ª, a drop or hammer member 2, and a slide 3 to confine the plate A', but as the devices employed for creating the center lugs *a* on the inner face of the coupling center A, constitute no part of the present invention, it is to be understood that any suitable mechanism can be employed for that purpose.

Having thus described my invention, what I claim and desire to secure by Letters Patent is:

1. A coupling-center provided on its interior with centering lugs integral with and constituted by the body metal of the coupling center, and having metal reinforcing pieces welded to the exterior of the body metal of the coupling-center behind said centering lugs.

2. A coupling-center provided on its interior with centering lugs integral with and constituted by the body metal of the coupling-center, and having metal reinforcing pieces welded to the exterior of the body metal of the coupling-center behind said centering lugs, the outer surface of the coupling center being continuous or unbroken.

In testimony whereof I affix my signature, in the presence of two subscribing witnesses.

GEORGE W. KERN.

Witnesses:
 GEO. N. REED,
 E. R. GNADE.